United States Patent
Summerer

(10) Patent No.: US 7,122,137 B2
(45) Date of Patent: Oct. 17, 2006

(54) DEVICE AND PROCESS FOR PRODUCING OPTICAL MOLDED PARTS FROM PLASTIC

(76) Inventor: Franz Josef Summerer, Gänsbach 33II, D-83253 Rimsting (DE)

( * ) Notice: Subject to any disclaimer, the term of this patent is extended or adjusted under 35 U.S.C. 154(b) by 428 days.

(21) Appl. No.: 10/348,149

(22) Filed: Jan. 21, 2003

(65) Prior Publication Data
US 2003/0137066 A1    Jul. 24, 2003

(30) Foreign Application Priority Data
Jan. 21, 2002  (DE) .............................. 102 02 246

(51) Int. Cl.
*B29D 11/00* (2006.01)
(52) U.S. Cl. ................. 264/2.2; 264/328.1; 425/450.1; 425/589; 425/808
(58) Field of Classification Search ............ 425/450.1, 425/589, 808; 264/1.1, 2.2, 328.1
See application file for complete search history.

(56) References Cited
U.S. PATENT DOCUMENTS
3,241,190 A * 3/1966 Laudisa ...................... 425/25

5,658,522 A * 8/1997 Fischer ..................... 264/328.7

FOREIGN PATENT DOCUMENTS
DE        43 13 015 C1      5/1994
DE        195 17 024 C1     6/1996

OTHER PUBLICATIONS
English abstract for DE 195 17 024.*

\* cited by examiner

*Primary Examiner*—Donald Heckenberg
(74) *Attorney, Agent, or Firm*—Laurence A. Greenberg; Werner H. Stemer; Ralph E. Locher

(57) ABSTRACT

A device has a first mold plate mounted rotatably using a shaft, and a second mold plate, between which a cavity is formed. The device further has an apparatus for applying an erecting force to the first mold plate such that in the open state of the device the first mold plate is inclined to the second mold plate, and an angle of inclination decreases with increasing degree of clamping of the device. The device further contains an axial guide in which the shaft of the first mold plate is mounted rotatably and at the same time displaceably in the direction of the second mold plate.

13 Claims, 5 Drawing Sheets

DEVICE AND PROCESS FOR PRODUCING OPTICAL MOLDED PARTS FROM PLASTIC

BACKGROUND OF THE INVENTION

1. Field of the Invention

The invention relates to a device and a process for producing optical molded parts, in particular completely transparent optical molded parts, from plastic.

Optical molded parts, in particular completely transparent optical molded parts such as glazings, for example, have been produced from glass as a rule, for a long time. Because of lesser weight, higher impact strength and increased design freedom, optical plastic molded parts have acquired increasing importance in recent past.

In order to produce optical plastic molded parts, use has been made so far of injection molding and embossing processes known in plastic processing. However, the known processes have substantial disadvantages in the case, in particular, of large-area optical molded parts such as glazings for motor vehicles, for example. Because of the inherently short runners in the injection molding process, it is necessary to expend a high injection pressure in producing large-area molded parts. However, this leads to high stresses and thus to warpage in the molded part. Moreover, strong sinking occurs in the subregion of the molded part remote from the gate. The molded parts frequently have faults in the surface that are to be ascribed to frontal flow when use is made of the known embossing process.

However, because of their relevance to safety, high optical demands are made, for example, of glazings of motor vehicles, so that neither the conventional injection molding process nor the conventional embossing process seems suitable for producing such optical plastic molded parts.

A device for carrying out a tilting embossing process is described in document German Patent DE 195 17 024 C2. The tilting embossing process prevents the production of strong stresses in the molded part and improves the surface quality. The device has a relatively complicated tilting mechanism. An axis of rotation of a swivel-mounted mold plate is pressed by a clamping device into a bearing bush that is constructed in a fixed mold plate.

SUMMARY OF THE INVENTION

It is accordingly an object of the invention to provide a device and a process for producing optical molded parts from plastic that overcome the above-mentioned disadvantages of the prior art devices and methods of this general type. The device for producing the optical molded part from plastic by a tilting embossing process furthermore has a mechanically suitable and simple configuration, particularly with reference to the guidance and/or mounting of the swivel-mounted second mold plate. The aim, furthermore, is to specify a process for producing an optical molded part from plastic that is easy to implement in mechanical terms.

With the foregoing and other objects in view there is provided, in accordance with the invention, a device for producing optical molded parts from plastic. The device contains two mold plates including a first mold plate mounted rotatably about an axis of rotation and having a shaft, and a second mold plate. A space between the first mold plate and the second mold plate defines a cavity in a clamped state of the device. An apparatus is provided for applying an erecting force to the first mold plate such that in an open state of the device, the first mold plate is inclined in regards to the second mold plate, and an angle of inclination decreases with an increasing degree of clamping of the device. An axial guide is provided in which the shaft of the first mold plate is mounted rotatably and at a same time displaceably in a direction of the second mold plate.

The device according to the invention for producing optical molded parts from plastic has a first mold plate mounted rotatably about an axis of rotation, and a second mold plate, between which a cavity is formed in the clamped state of the device. An erecting force is applied to the first mold plate such that in the open state of the device the first mold plate is inclined to the second mold plate. Furthermore, the device has an axial guide in which the axis of rotation of the first mold plate is mounted rotatably and at the same time displaceably in the direction of the second mold plate. The effect of the axial guide is that the first mold plate always has a defined guidance of movement and rotation independently of the degree of approach and clamping.

In order to clamp the device, the first mold plate is moved in accordance with the longitudinally displaceable mounting by the axial guide in the direction of the second mold plate until the mold plates make contact at stop faces. The device is further clamped, the first mold plate approaching the second mold plate by a tilting movement on the basis of the resistance of the second mold plate such that the angle of inclination decreases as the degree of clamping of the device increases. The rotary bearing effected by the axial guide comes into play thereby. At the end of the clamping process, the two mold plates are situated largely parallel to one another. Plastic is injected into the cavity essentially during the overall tilting movement.

This combined technique of injection molding and embossing has the advantage that the tilting movement of the first mold plate strongly supports the distribution of the molding compound inside the cavity. Despite long runners, it is possible in this way to use a relatively low injection pressure such that only very slight stresses occur in the molded part. In addition, the embossing process already begun during the injection molding phase prevents frontal flow, thus ensuring that the molded part has a surface that is of high quality.

A particularly preferred variant embodiment of the device is defined in that the axial guide is formed as a support extending substantially perpendicular to the second mold plate and has a longitudinal through hole as an axial receptacle.

It is, furthermore, advantageous that the second mold plate has a guiding cutout into which the axial guide dips upon the approach of the two mold plates. The result of this is to ensure that the two mold plates are highly accurately centered relative to one another during the process of approach.

In accordance with an added feature of the invention, the second mold plate is a mold core plate having a mold core and a plastic feed unit disposed in an edge region of the mold core for injecting plastic into the cavity.

In accordance with an additional feature of the invention, the second mold plate is a cavity mold plate, and the first mold plate has a cutout formed therein and a plastic feed unit for injecting plastic into the cavity disposed in an edge region of the cutout.

In accordance with a further feature of the invention, the first mold plate has a plate cavity formed therein, and the two mold plates define a vertical flash face gap formed therebetween and adjoining the plate cavity.

In accordance with another feature of the invention, the plastic feed unit has a nozzle, and the shaft of the first mold plate is fixed in a region of the vertical flash face gap near the nozzle.

In accordance with another further feature of the invention, a balancing element is provided for distributing a compressive force and disposed in at least one of the two mold plates in a region to which pressure is applied.

In accordance with a concomitant feature of the invention, at least one of the two mold plates has a convexly formed recess formed therein extending from a surface in a region to which the pressure is applied.

Other features which are considered as characteristic for the invention are set forth in the appended claims.

Although the invention is illustrated and described herein as embodied in a device and a process for producing optical molded parts from plastic, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
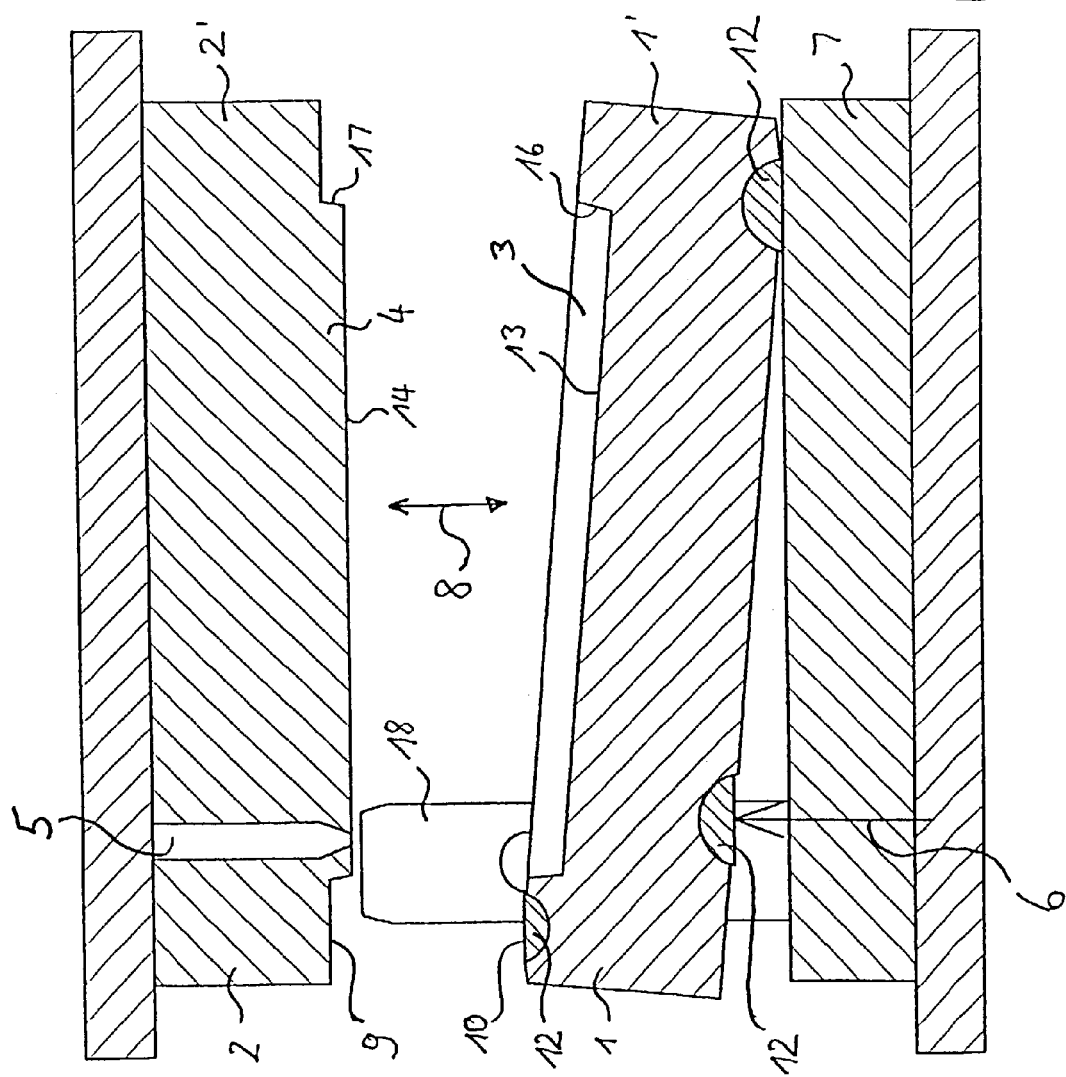
FIG. 1 is a diagrammatic, sectional view of a region of a mold core of a device according to the invention for producing optical molded parts from plastic, in an open state before a start of a production process.

Referring now to the figures of the drawing in detail and first, particularly, to FIG. 1 thereof, there is shown a device according to the invention that has a first mold plate 1' and a second mold plate 2'. The second mold plate 2' being of a fixed configuration, which is to say a stationary configuration in a preferred exemplary embodiment. In the figures, the first mold plate 1' is always configured as a cavity mold plate 1, and the second mold plate 2' is always configured as a mold core plate 2. However, the first mold plate 1' can also be configured as a mold core plate, and the second mold plate 2' can consequently be configured as a cavity mold plate. A cutout 3 with a prescribed largely three-dimensional shape is provided in the cavity mold plate 1. At its front end, the mold core plate 2 has a mold core 4 whose external shape is adapted to the shape of the cutout 3. The mold core 4 can be configured both in one piece with the mold core plate 2, and as an independent, preferably exchangeable mold part. A plastic feed unit 5, for example in the form of a hot runner directly adjoins the article to be produced, is provided in an edge region of the mold core 4 in the second mold plate 2', thus in the mold core plate 2 in accordance with FIG. 1. If the second mold plate 2' is a cavity mold plate, the plastic feed unit is consequently advantageously provided in an edge region of the cutout 3.

In the open state, which is illustrated in FIG. 1, the first mold plate 1' is inclined by an angle, for example in the range from 0° to 30°, to the second mold plate 2'. The inclination is effected, for example, by virtue of the fact that the first mold plate 1' is rotatably mounted and has an erecting force produced by a mechanical, hydraulic, or pneumatic device 30 (FIG. 3) or by a spring applied to it on the side situated opposite the plastic feed unit 5. The erecting force is indicated by force arrow 6 in FIG. 1. The first mold plate 1' lies on a base plate 7 on a side remote from the point of action of the erecting force. In an open state of the device, the first mold plate 1' is thereby inclined to the second mold plate 2' in such a way that the spacing between the mold plates 1' and 2', that is to say between the cavity mold plate 1 and the mold core plate 2, is least in that edge region of the mold core 4 or of the cutout 3 in which the plastic feed unit 5 is disposed. The second mold plate 2' and the base plate 7 are always largely parallel to one another during the entire production process.

Figure 2:
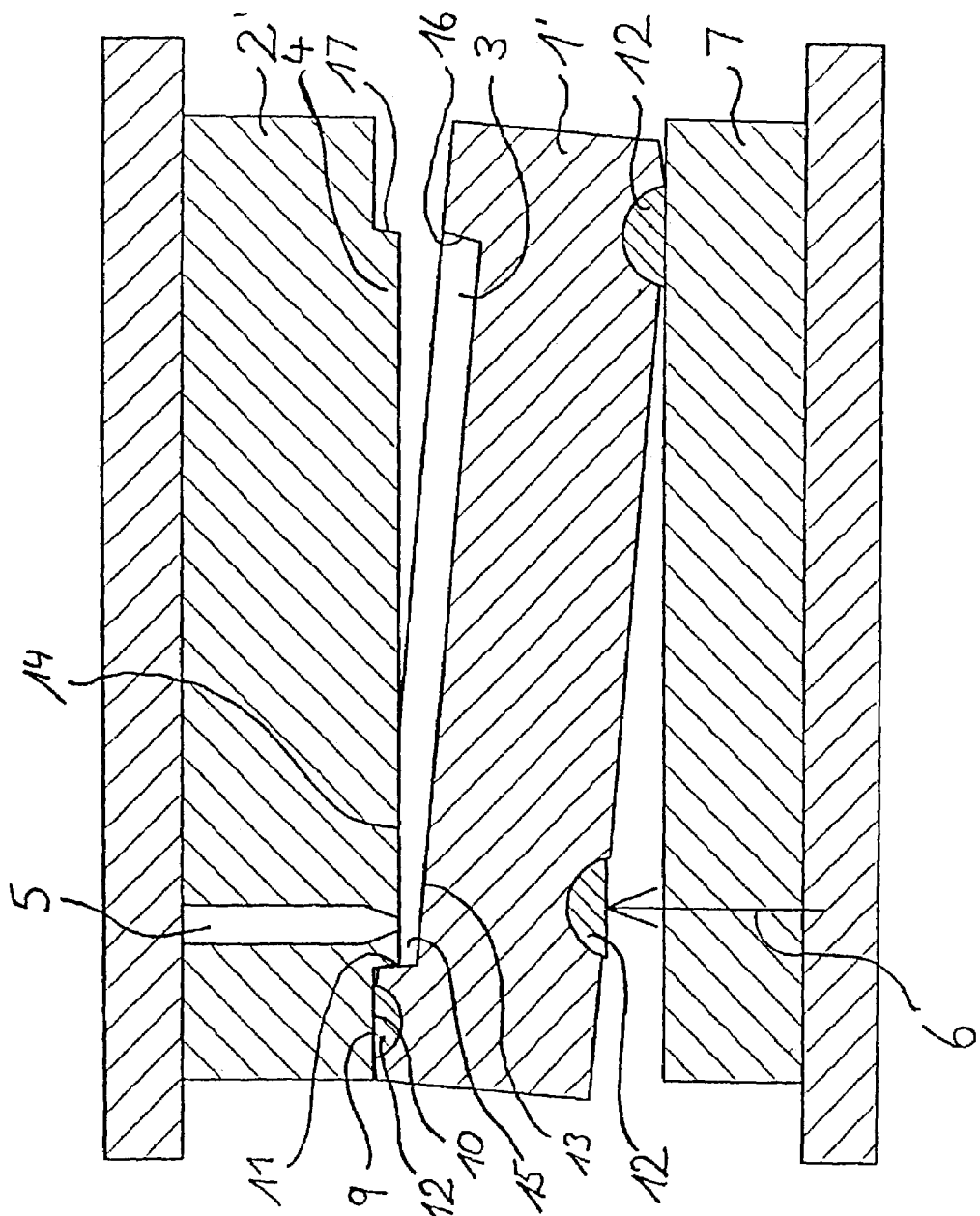
FIG. 2 is a sectional view of the device in accordance with FIG. 1 in a state of the process when the two mold plates just make contact.

The base plate 7 can be moved relative to the second mold plate 2' together with the first mold plate 1' in the direction of arrow 8. In FIG. 2, the device according to the invention is shown in a stage of the process when a stop surface 9 on the mold core side which borders immediately on the mold core 4 of the mold core plate 2 has made contact with a stop face 10 that borders immediately on the cutout 3 of the cavity mold plate 1. A further movement of the base plate 7 in the direction of the second mold plate 2' then leads to a tilting movement of the first mold plate 1'. A precondition for this is that the compressive force of the base plate 7 is greater than the erecting force that acts on the first mold plate 1'. By appropriate structural configuration of the device (compare FIGS. 4 and 5), the axis of rotation for the tilting movement of the first mold plate 1' is advantageously fixed in the region of a vertical flash face gap 11 near a nozzle of the plastic feed unit 5, the gap 11 will be explained more precisely further below. However, the axis of rotation can also alternatively be fixed in the region of the vertical flash face gap 11 remote from the nozzle. The terms near the nozzle and remote from the nozzle always relate to the distance from the plastic feed unit 5.

In order for the compressive forces which occur per se at points to be distributed over surfaces during the tilting movement, and in order to avoid lateral forces, it is advantageous to provide balancing elements 12 in the regions of the first mold plate 1' to which pressure is applied. In the simplest case, the balancing elements 12 are configured as a spherical section 12 that is mounted rotatably in corresponding cutouts in the first mold plate 1'. As an alternative to this, the spherical sections can, however, also be fastened at the corresponding points of the second mold plate 2', the base plate 7 and, for example, the hydraulic punch in order apply the erecting force 6, and in each case dip into a cutout in the first mold plate 1'. In a simplified embodiment, it is also possible to dispense with the balancing elements 12. Instead of this, the regions of the first mold plate 1' and of the hydraulic punch to which pressure is applied are configured convexly on the outside. The surface pressure is also reduced during the embossing operation, and thus the setting time is somewhat lengthened.

Figure 3:
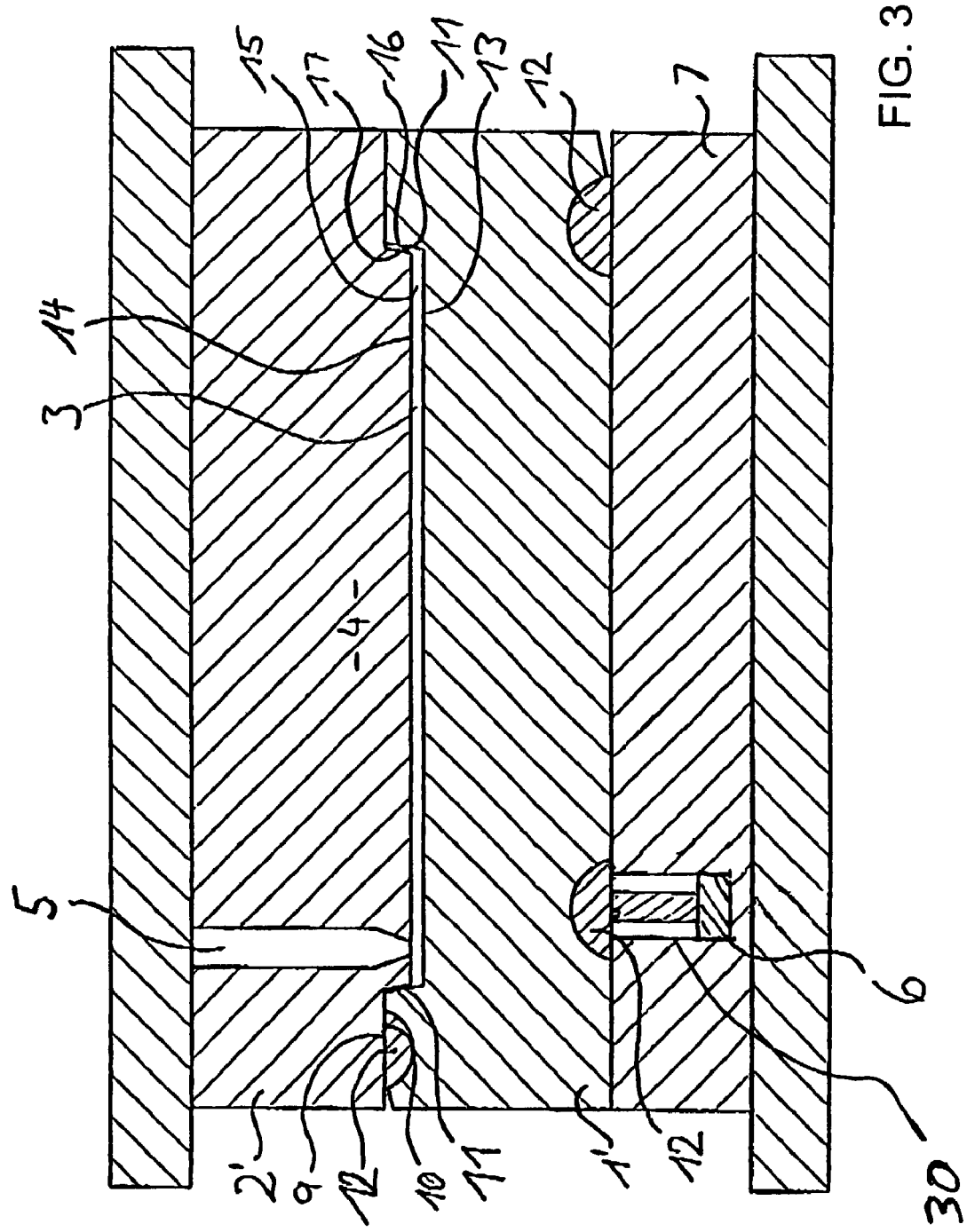
FIG. 3 is a sectional view of the device in accordance with FIG. 1 after an end of a clamping movement.

In the completely clamped state, illustrated in FIG. 3, as well, a bounding wall 13 of the cutout 3 has a predetermined spacing from an outer bounding wall 14 of the mold core 4, the result being the formation of a cavity 15. The shape of the cavity 15 determines the shape of the end product to be produced by an injection operation. Adjoining the cavity 15 is the vertical flash face gap 11 that is bounded by a vertical flash face 16 on the cavity plate side and a vertical flash face 17 on the core plate side. The vertical flash face keeps the molding compound from exiting via the cavity 15. A specific vertical flash face gap 11 can also balance out manufacturing tolerances. Again, on the side remote from the nozzle, for example, the vertical flash face gap 11 permits a specific over-spraying as a function of a pressure-relief valve. The gap width of the vertical flash face gap 11 is, for example 0.01 mm to 0.1 mm. Gap widths of up to several millimeters are also conceivable given specific over-spraying.

Figure 4:
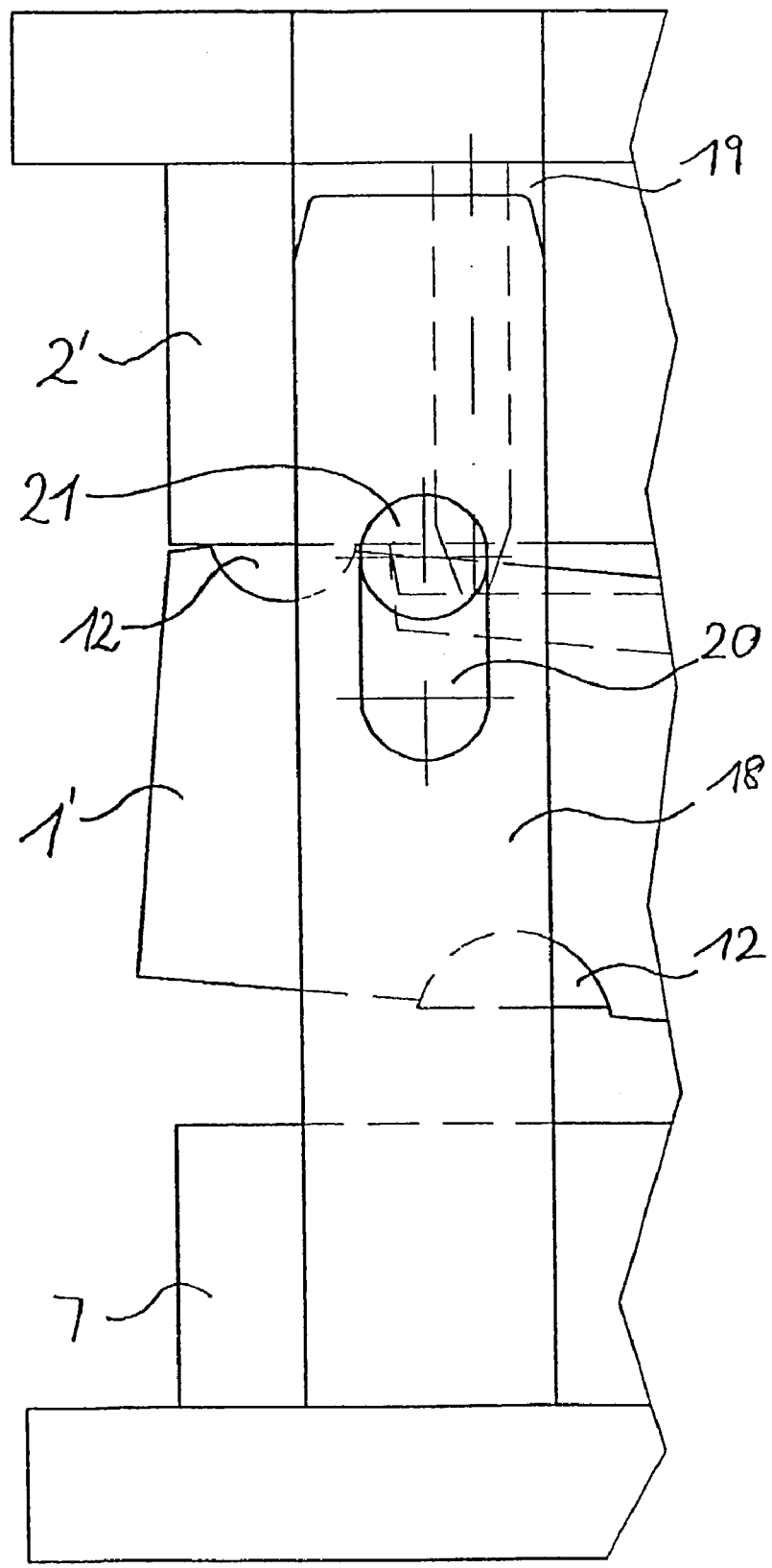
FIG. 4 is a partial, diagrammatic view of the device in a region of an axial guide when the two mold plates just make contact.
Figure 5:
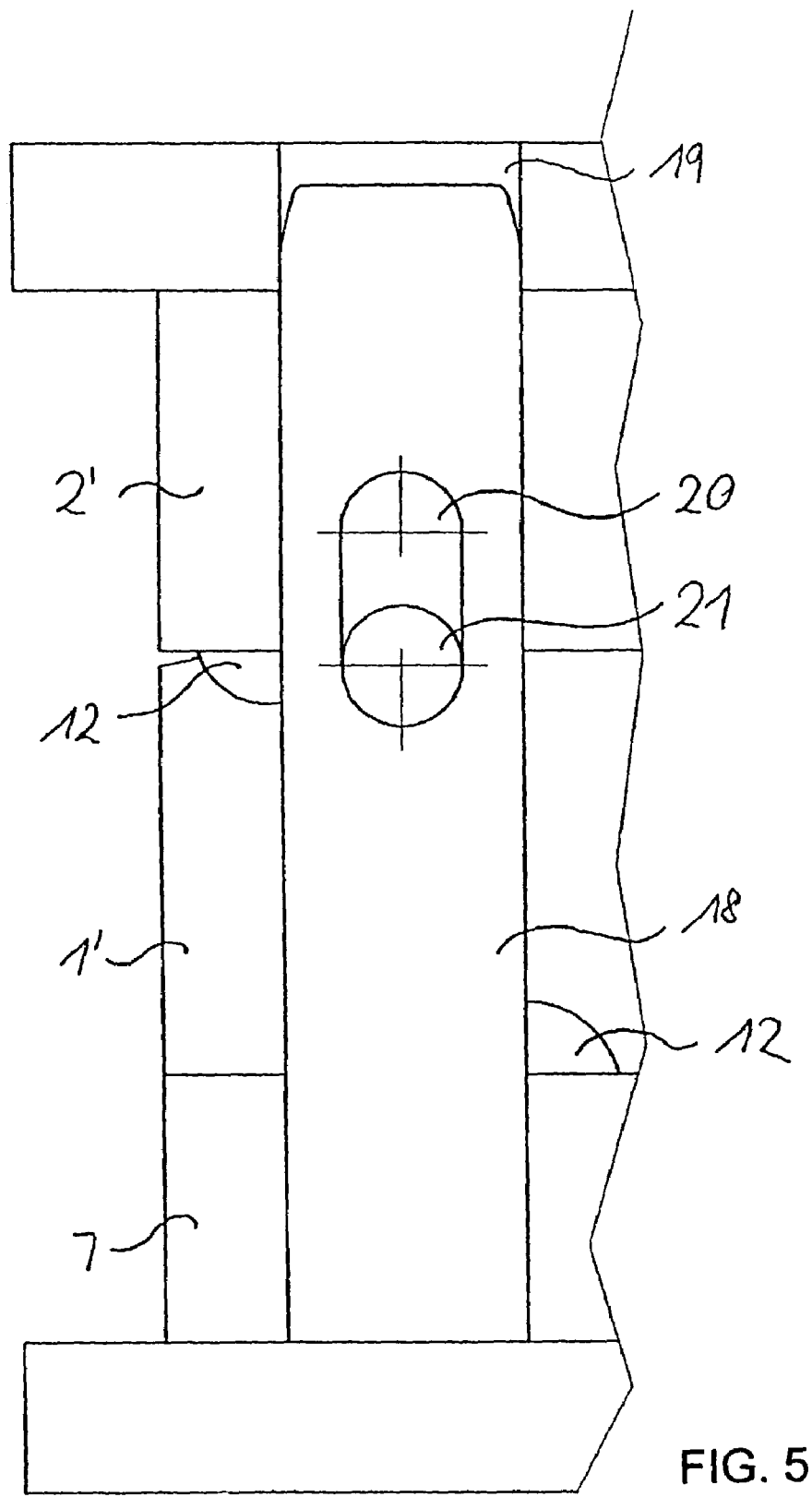
FIG. 5 is a partial, diagrammatic view of the device in the region of the axial guide after the end of the clamping movement.

Provided on the base plate 7 are axial guides 18 that either are configured in one piece with the base plate 7, or are fastened on the base plate 7 (FIG. 4). For reasons of simplification, only one axial guide is illustrated in FIG. 4, but a plurality of axial guides, normally two, are advantageously provided. The axial guide 18 is configured in such a way that during a clamping operation of the device it dips into a guiding cutout 19 in the second mold plate 2' and thereby ensures exact centering and guidance of the two mold plates relative to one another—such a guide is also denoted as a land guide in the specialist jargon. The contours, invisible per se, of the plastic feed unit 5 situated in the inner region of the device, in particular in the region of the mold core 4, and of the cavity 15 are illustrated by dashes in FIG. 4.

Provided in the axial guide 18, preferably in the form of a longitudinal through hole, is a shaft holding region 20 in which a shaft 21 is guided. The shaft 21 is preferably rigidly connected to the first mold plate 1'. The central axis of the shaft 21 is simultaneously the axis of rotation of the tilting movement of the first mold plate 1'. Depending on the tilting movement of the first mold plate 1', the shaft 21 is moved with increasing degree of clamping on the device from the end, remote from the base plate 7, on the shaft holding region 20 (compare FIG. 4) to the end, near the base plate 7, of the shaft holding region 20 (compare FIG. 5).

The production of a plastic molded part by the device according to the invention are now explained in more detail. In the open state, the mold core 4 is located outside the cutout 3 on the cavity plate side. The base plate 7 is now moved together with the first mold plate 1' in the direction of the second mold plate 2'. As soon as the stop surfaces 9 and 10 of the mold core plate 2 and the cavity mold plate 1, respectively, make contact, plastic is injected into the cavity 15 via the plastic feed unit 5. The injection operation can also be begun within a prescribed time interval, for example 2 seconds before or after the contact, or when a prescribed spacing, for example 2 mm, of the stop faces 9 and 10 is reached. The only decisive thing is that the plastic is reliably prevented from escaping from the cavity 15.

While the plastic is being injected into the cavity 15, the base plate 7 is further moved, together with the first mold plate 1', in the direction of the second mold plate 2'. The movement of the base plate 7 together with the first mold plate 1' effects a type of tilting movement of the first mold plate 1' such that the inclination of the first mold plate 1' to the second mold plate 2' decreases continuously with increasing degree of clamping of the device. In the completely clamped state, the cavity mold plate 1 and mold core plate 2 are largely situated parallel to one another. The plastic is distributed, supported by the tilting movement of the first mold plate 1, from the region of the plastic feed unit 5 in the direction of the edge region, remote therefrom, of the cavity 15 that is being formed.

After the device has been clamped, the injection pressure is advantageously maintained for a prescribed time interval such that sinking in the region near the nozzle is avoided. The tilting embossing process takes over this task more and more with increasing distance from the nozzle.

It is also conceivable for the injection operation to be performed at least substantially before the beginning of the tilting movement, that is to say for at least a major part of the molding compound to be injected into the cavity 15 as early as the beginning of the tilting movement.

After the end of the clamping operation and a certain solidification of the plastic, the device is opened again and the finished molded part is removed from the device by a non-illustrated ejecting device.

I claim:

1. A device for producing optical molded parts from plastic, comprising:
   two mold plates including a first mold plate having a shaft and mounted rotatably about an axis of rotation defined by said shaft, and a second mold plate, a space between said first mold plate and said second mold plate defining a cavity in a clamped state of the device;
   a plastic feed unit for feeding plastic into said cavity;
   an apparatus for applying an erecting force to said first mold plate such that in an open state of the device, said first mold plate being inclined in regards to said second mold plate, and an angle of inclination decreases with an increasing degree of clamping of the device; and
   an axial guide in which said shaft of said first mold plate being mounted displaceably in a direction of said second mold plate.

2. The device according to claim 1, wherein said axial guide is a support extending substantially perpendicular to said second mold plate and has a longitudinal through hole formed therein as an axial receptacle.

3. The device according to claim 1, wherein said second mold plate has a guiding cutout formed therein into which said axial guide dips upon an approach of said two mold plates.

4. The device according to claim 1, wherein said second mold plate is a mold core plate having a mold core, and said plastic feed unit is disposed in said second mold plate at an edge region of said mold core.

5. The device according to claim 1, wherein:
   said second mold plate is a cavity mold plate having a cutout formed therein, and said plastic feed unit is disposed in said second mold plate at an edge region of said cutout.

6. The device according to claim 4, wherein said first mold plate has a plate cavity formed therein, and said two mold plates defining a vertical flash face gap formed therebetween and adjoining said plate cavity.

7. The device according to claim 6, wherein:
   said plastic feed unit has a nozzle; and
   said shaft of said first mold plate is fixed in a region of said vertical flash face gap near said nozzle.

8. The device according to claim 1, further comprising a balancing element for distributing a compressive force and disposed in at least one of said two mold plates in a region to which pressure is applied.

9. The device according to claim 8, wherein at least one of said two mold plates has a convexly formed structure extending from a surface in a region to which the pressure is applied.

10. A process for producing optical molded parts from plastic, which comprises the steps of:
  providing the device according to claim 1;
  clamping the device such that the first mold plate, mounted rotatably about the axis of rotation with the shaft disposed in the axial guide and at the same time displaceably in the direction of the second mold plate, being moved in a direction of the second mold plate until the two mold plates make contact at stop faces;
  further clamping the device such that the first mold plate approaches the second mold plate through a tilting movement; and
  injecting plastic into the cavity formed between the first mold plate and the second mold plate, the plastic being substantially injected during the tilting movement.

11. A process for producing optical molded parts from plastic, which comprises the steps of:
  providing the device according to claim 1;
  clamping the device such that the first mold plate, mounted rotatably about the axis of rotation with the shaft disposed in the axial guide and at the same time displaceably in the direction of the second mold plate, being moved toward the second mold plate until the two mold plates make contact at stop faces;
  further clamping the device such that the first mold plate approaches the second mold plate through a tilting movement; and
  injecting plastic into the cavity formed between the first mold plate and the second mold plate, the plastic being injected substantially before a start of the tilting movement.

12. A process for producing optical molded parts from plastic, which comprises the steps of:
  providing the device according to claim 1;
  providing the axial guide as a support extending substantially perpendicular to the second mold plate and having a longitudinal through hole formed therein as an axial receptacle;
  clamping the device such that the first mold plate, mounted rotatably about the axis of rotation with the shaft disposed in the axial guide and at the same time displaceably in the direction of the second mold plate, being moved in a direction of the second mold plate until the two mold plates make contact at stop faces;
  further clamping the device such that the first mold plate approaches the second mold plate through a tilting movement; and
  injecting plastic into the cavity formed between the first mold plate and the second mold plate, the plastic being substantially injected during the tilting movement.

13. A process for producing optical molded parts from plastic, which comprises the steps of:
  providing the device according to claim 1;
  providing the axial guide as a support extending substantially perpendicular to the second mold plate and having a longitudinal through hole formed therein as an axial receptacle;
  clamping the device such that the first mold plate, mounted rotatably about the axis of rotation with the shaft disposed in the axial guide and at the same time displaceably in the direction of the second mold plate, being moved toward the second mold plate until the two mold plates make contact at stop faces;
  further clamping the device such that the first mold plate approaches the second mold plate through a tilting movement; and
  injecting plastic into the cavity formed between the first mold plate and the second mold plate, the plastic being injected substantially before a start of the tilting movement.

* * * * *